(12) United States Patent
Abels et al.

(10) Patent No.: US 9,401,846 B2
(45) Date of Patent: Jul. 26, 2016

(54) INFORMATION HANDLING SYSTEM CONFIGURATION IDENTIFICATION TOOL AND METHOD

(75) Inventors: Timothy Abels, Pflugerville, TX (US); Brian L. Janosky, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 1151 days.

(21) Appl. No.: 11/873,606

(22) Filed: Oct. 17, 2007

(65) Prior Publication Data

US 2009/0106459 A1 Apr. 23, 2009

(51) Int. Cl.
*G06F 3/00* (2006.01)
*H04L 12/24* (2006.01)

(52) U.S. Cl.
CPC .......... *H04L 41/0853* (2013.01); *H04L 41/082* (2013.01); *H04L 41/0859* (2013.01)

(58) Field of Classification Search
None
See application file for complete search history.

(56) References Cited

U.S. PATENT DOCUMENTS

| | | | | |
|---|---|---|---|---|
| 5,507,002 A * | 4/1996 | Heil | ................................. | 710/8 |
| 5,655,148 A * | 8/1997 | Richman | ............... | G06F 9/4411 710/11 |
| 5,748,980 A * | 5/1998 | Lipe | ...................... | G06F 15/177 710/104 |
| 6,115,755 A * | 9/2000 | Krishan | ......................... | 709/250 |
| 6,308,205 B1 * | 10/2001 | Carcerano et al. | ............ | 709/221 |
| 6,442,529 B1 * | 8/2002 | Krishan et al. | ............. | 705/14.52 |
| 6,529,909 B1 * | 3/2003 | Bowman-Amuah | | G06F 17/30569 |
| 6,781,972 B1 * | 8/2004 | Anderlind et al. | ............ | 370/329 |
| 6,785,894 B1 * | 8/2004 | Ruberg | .......................... | 719/321 |
| 6,836,807 B2 * | 12/2004 | Wu et al. | ............................. | 710/8 |
| 6,892,210 B1 * | 5/2005 | Erickson et al. | .............. | 707/201 |
| 7,181,445 B2 * | 2/2007 | Bebo et al. | | |
| 7,386,641 B2 * | 6/2008 | Xu et al. | .......................... | 710/19 |
| 7,457,991 B1 * | 11/2008 | Teague et al. | ................. | 714/47.1 |
| 7,596,102 B2 * | 9/2009 | Forbes et al. | .................. | 370/260 |
| 7,689,678 B2 * | 3/2010 | Yip et al. | ....................... | 709/221 |
| 7,831,621 B1 * | 11/2010 | Banks et al. | ................... | 707/790 |
| 7,941,359 B2 * | 5/2011 | Tanner | ............................. | 705/37 |
| 8,234,562 B1 * | 7/2012 | Evans et al. | .................... | 715/224 |
| 2001/0011010 A1 * | 8/2001 | Takekawa et al. | ........... | 455/67.1 |
| 2002/0124063 A1 * | 9/2002 | Foster et al. | ................... | 709/221 |
| 2002/0124245 A1 * | 9/2002 | Maddux | .................... | G06F 8/60 717/176 |
| 2002/0161891 A1 * | 10/2002 | Higuchi et al. | ............... | 709/226 |
| 2003/0028826 A1 * | 2/2003 | Balluff | ............................ | 714/44 |
| 2003/0058277 A1 * | 3/2003 | Bowman-Amuah | ............ | G06F 17/30607 715/765 |
| 2003/0074444 A1 * | 4/2003 | Ahrens et al. | ................. | 709/224 |
| 2003/0139175 A1 * | 7/2003 | Kim | ............................... | 455/419 |
| 2003/0188049 A1 * | 10/2003 | Dickens | ............................ | 710/8 |
| 2003/0196008 A1 * | 10/2003 | Kim | ................................. | 710/19 |

(Continued)

*Primary Examiner* — Henry Tsai
*Assistant Examiner* — Christopher Bartels
(74) *Attorney, Agent, or Firm* — Larson Newman, LLP

(57) ABSTRACT

A tool for communicating configuration information includes an analysis tool to determine changes to the configuration of an information handling device. The analysis tool develops a set of configuration tags to identify the configuration changes by identifying a subset of tables or other information, such as Extensible Markup Language (XML) pairs, associated with a configuration management database (CMDB) and by identifying values for each table to reflect the configuration of the information handling device. The analysis tool encodes the configuration tags into an information string. Because the information string is encoded and does not represent the complete configuration of the information handling system configuration, it can be easily and accurately communicated to a technical support center by a user, thereby reducing potential communication problems and improving technical support.

20 Claims, 3 Drawing Sheets

(56) References Cited

U.S. PATENT DOCUMENTS

| | | | |
|---|---|---|---|
| 2003/0228866 A1* | 12/2003 | Pezeshki | 455/422.1 |
| 2003/0232616 A1* | 12/2003 | Gidron et al. | 455/406 |
| 2004/0002973 A1* | 1/2004 | Chaudhuri et al. | 707/7 |
| 2004/0107125 A1* | 6/2004 | Guheen et al. | 705/7 |
| 2004/0143664 A1* | 7/2004 | Usa et al. | 709/226 |
| 2004/0248561 A1* | 12/2004 | Nykanen et al. | 455/414.2 |
| 2005/0114593 A1* | 5/2005 | Cassell et al. | 711/114 |
| 2005/0176425 A1* | 8/2005 | Kawakami et al. | 455/432.3 |
| 2005/0193103 A1* | 9/2005 | Drabik | H04L 63/0272 709/221 |
| 2005/0222933 A1* | 10/2005 | Wesby | 705/36 |
| 2005/0246311 A1* | 11/2005 | Whelan et al. | 707/1 |
| 2005/0283457 A1* | 12/2005 | Sonkin et al. | 707/1 |
| 2006/0035713 A1* | 2/2006 | Cockerille et al. | 463/42 |
| 2006/0085442 A1* | 4/2006 | Fujiwara | 707/100 |
| 2006/0136566 A1* | 6/2006 | Ohara et al. | 709/217 |
| 2006/0161444 A1* | 7/2006 | Lubrecht et al. | 705/1 |
| 2006/0217152 A1* | 9/2006 | Fok et al. | 455/557 |
| 2006/0218372 A1* | 9/2006 | Ward | 711/173 |
| 2006/0256012 A1* | 11/2006 | Fok et al. | 342/457 |
| 2006/0282823 A1* | 12/2006 | Li et al. | 717/121 |
| 2007/0061446 A1* | 3/2007 | Matsuo et al. | 709/224 |
| 2007/0093924 A1* | 4/2007 | Engel et al. | 700/104 |
| 2007/0100712 A1* | 5/2007 | Kilpatrick et al. | 705/29 |
| 2007/0239700 A1* | 10/2007 | Ramachandran | 707/5 |
| 2008/0162161 A1* | 7/2008 | Mamakos | 705/1 |
| 2008/0270305 A1* | 10/2008 | Andreasson et al. | 705/50 |
| 2009/0063274 A1* | 3/2009 | Dublin et al. | 705/14 |
| 2009/0063562 A1* | 3/2009 | Dinger et al. | 707/104.1 |
| 2009/0099965 A1* | 4/2009 | Grant, IV | 705/41 |
| 2009/0119256 A1* | 5/2009 | Waters | H04L 41/5064 |

\* cited by examiner

INFORMATION HANDLING SYSTEM CONFIGURATION IDENTIFICATION TOOL AND METHOD

FIELD OF THE DISCLOSURE

The present disclosure relates to information handling systems and more particularly to tools for identifying the configuration of information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A technical support center can provide technical for an information handling system. In order to provide appropriate solutions, it is typically useful for the technical support center to determine the configuration of the information handling system, including the hardware and software installed at the system. However, because the configuration of information handling systems can be modified by a user (such as by installing new software), it can be difficult for the technical support center to determine the configuration. One solution has been to record, at the information handling system, configuration information reflecting the system configuration in a configuration management database (CMDB). However, because the configuration information can be complex, communicating the information to the technical support center can be difficult. Accordingly, there is need for an improved technique to communicate configuration information for an information handling system.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A tool for communicating configuration information includes an analysis tool to determine changes to the configuration of an information handling device. The analysis tool develops a set of configuration tags to identify the configuration changes by identifying a subset of tables or other information, such as XML pairs, associated with a configuration management database (CMDB) and by identifying values for each table to reflect the configuration of the information handling device. The analysis tool encodes the configuration tags into an information string. Because the information string is encoded and does not represent the complete configuration of the information handling system configuration, it can be easily and accurately communicated to a technical support center by a user, thereby reducing potential communication problems and improving technical support.

Figure 1:
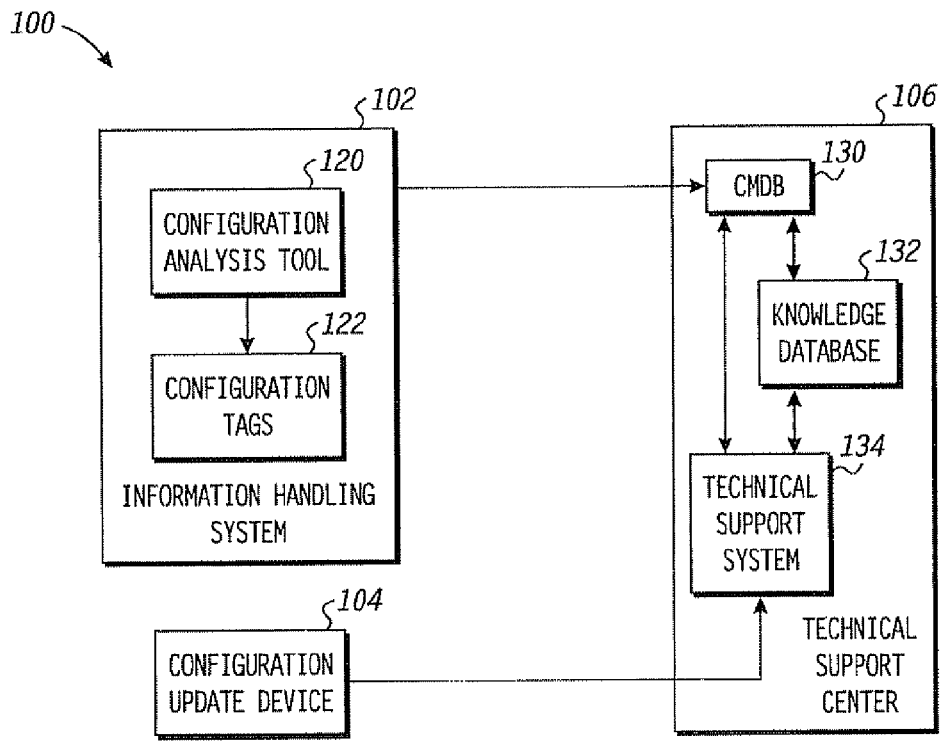
FIG. 1 is a block diagram of a particular embodiment of an information handling system and an associated technical support center.

FIG. 1 illustrates a system 100 including an information handling system 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. An information handling system may include memory, one or more processing resources such as a central processing unit (CPU) or hardware or software control logic. Additional components of an information handling system may include one or more storage devices, one or more communications ports for communicating with external devices as well as various input and output (I/O) devices, such as a keyboard, a mouse, and a video display. An information handling system may also include one or more buses operable to transmit communications between the various hardware components.

The system 100 also includes a technical support center 106 and configuration update device 104. The configuration update device 104 allows a user to communicate configuration information and can be a telephone, an interactive voice response (IVR) system, a chat program, a PDA, a cell phone, or other device that allows a user to communicate with the technical support center 106. The configuration update device 104 can communicate with the technical support center 106 via a telephone network, a wide area data network such as the Internet, and the like. The information handling system 102 can also communicate with the technical support center via a telephone network, a wide area data network such as the Internet, and the like.

The information handling system includes a configuration analysis tool 120 that creates configuration tags 122. The technical support center 106 includes a configuration management database (CMDB) 130, a knowledge database 132, and a technical support system 134. The technical support system 134 can be an information handling system used by a support technician to access the CMDB 130 and the knowledge database 132. In addition, the knowledge database 132 and the CMDB 130 are accessible to each other.

In operation, the configuration analysis tool 120 determines configuration information based on the configuration of the information handling system 102. As used herein, the configuration of the information handling system 102 refers to information indicating the hardware, firmware, data, software, any configurable item, or any combination thereof, installed at the information handling system 102. The configuration can also include peripheral devices connected to the information handling system 102. The hardware configuration can include the type of processor at the information handling system 102, the amount of memory, and the like. The software configuration can include the operating system installed at the information handling system 102, software drivers, and the like.

The configuration analysis tool 120 can periodically provide the configuration information to the CMDB 130 at the technical support center 106. The CMDB 130 can store the configuration information and provide the information to the technical support system 134 in response to a request. For example, a user may contact the technical support center 106 with a technical issue or question regarding the information handling system 100. In response, a support technician can enter a system identification number associated with the information handling system 102 at the technical support system 134. The technical support system 134 can retrieve the configuration information for the information handling system 102 from the CMDB 130 using the system identification number. The configuration information can be displayed for the support technician. The support technician can use the technical support system 134 to access the knowledge database 132 based on the displayed configuration information. Thus, the support technician can address the technical support issue or question based on the specific configuration of the information handling system 102, thereby improving the likelihood that the problem or question can be successfully addressed.

In some situations, changes can be made to the configuration of the information handling system 102 that the configuration analysis tool 120 cannot report to the technical support center 106. For example, the communication link between the information handling system 102 and the technical support center 106 can be unavailable when a change is made, or when the configuration analysis tool seeks to update the configuration information at the CMDB 130. This can result from, for example, the change in configuration resulting in a change to the communication link, such as if new networking hardware or software is installed at the information handling system 102.

Accordingly, between providing updates to the CMDB 130, the configuration analysis tool 120 can record changes to the configuration as the configuration tags 122. The configuration tags 122 identify changes to the configuration of the information handling system 102 since the CMDB was last updated. Accordingly, the configuration tags identify configuration items that have been changed since the last update to the CMDB 130, but typically do not include complete configuration information for the information handling system 102. This allows the configuration tags 122 to be encoded as one or more short information strings. These information strings can be displayed to a user who can then provide the information strings to the technical support center 106 via the configuration update device 104. A support technician can enter the strings at the technical support system 134, which decodes the strings and displays the configuration changes for the support technician. Thus, the technical support system 134 can determine the updated configuration for the information handling system even when there is not a direct communication link between the information handling system 102 and the technical support center 106.

As an example, a user can install a new network card at the information handling system 102. The configuration analysis tool records information identifying the new network card in the configuration tags 122. The user may identify a problem after installing the network card, such as the loss of communication with the Internet. In response, the user communicates with the technical support center 106 via the configuration update device 104. A support technician at the technical support center 106 requests the user to provide a system identification number for the information handling system 102 and enters the provided number at the technical support system 134. In response, the technical support system 134 retrieves configuration information for the information handling system 102 and displays it at the technical support system 134.

In addition, the support technician can request the user provide the information string for the configuration tags 122. The user requests the string from the configuration analysis tool 120, which encodes the configuration tags 122 to determine the string. The configuration analysis tool 120 then displays the information string for the user, who provides the string to the technical support center 106 via the configuration update device 104. For example, the user can read the information string to the support technician via a telephone. Alternatively, the user could text message the string, or enter the string at a web site displayed on a cellular phone. Depending on the type of device used to provide the information string, the string can be entered automatically at the technical support system 134 or entered manually be a support technician. In a particular embodiment, the information string is a short string of alphanumeric characters. This allows the string to be quickly and accurately communicated by the user to the technical support center 106.

In response to receiving the information string, the technical support system 134 updates the configuration information for the information handling system 102. In one embodiment, the technical support system 134 updates the configuration information only for use at the technical support system 134. In another embodiment, the technical support system 134 updates the configuration information at the CMDB 130. In either case, the updated configuration information is available at the technical support system 134 so that the user's problem can be addressed based on the updated configuration. This improves the speed and accuracy with which the technical support center 106 can address technical support inquiries.

As referred to above, the configuration tags 122 represent changes to the configuration of the information handling system 102 since a previous update, rather than complete configuration information for the information handling system 102. Accordingly, the configuration tags 122 represent a subset of the configuration information categories that are stored by the CMDB 130. As used herein, the term subset means that the configuration tags represent some, but not all, of the possible configuration information categories that can be represented at the CMDB 130 for the information handling system 102. By representing only a subset of the configuration information categories at the CMDB 130, the configuration tags can be encoded in a short information string that can be easily and quickly communicated to the technical support center 106. Further, as used herein, a configuration information category refers to configuration information for a particular aspect of configuration for an information handling system. Examples of configuration information categories include installed hardware of different types, such as processor types, networking hardware, peripherals, and the like, and installed software of different types, such as operating systems, drivers, and the like.

Figure 2:
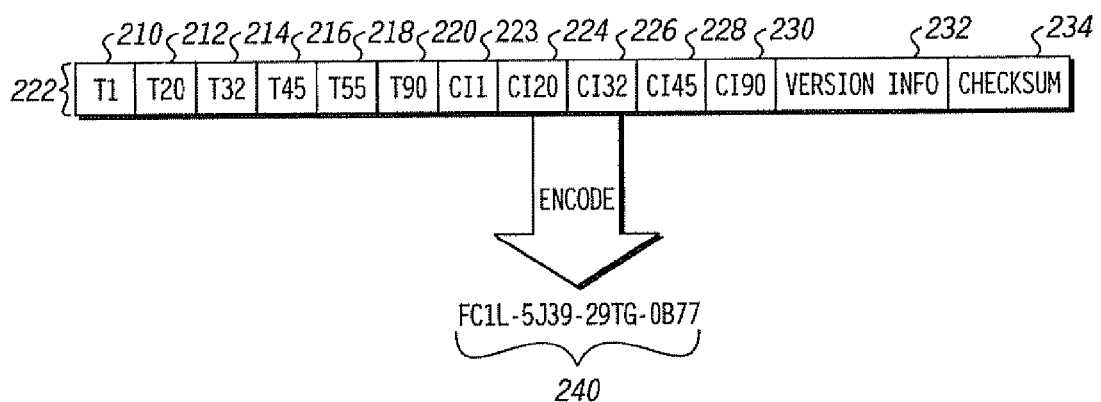
FIG. 2 is a diagram of a particular embodiment of configuration information of FIG. 1.

FIG. 2 illustrates a particular embodiment of configuration tags 222 and an associated encoded string 240. The configuration tags 222 include configuration table fields 210, 212, 214, 216, 218, and 220, and configuration item fields 223, 224, 226, 228, and 230. The configuration tags 222 also include version information 232 and checksum information 234.

Each of the configuration table fields 210-220 includes an identifier for a particular table at the CMDB 130. For example, configuration table field 210 includes an identifier for table T1 of the CMDB 130. Each of these configuration tables can identify a different configuration item type. For example, table T1 can indicate possible network hardware installed at the information handling system 102, while table T20 (identified at configuration table field 212) can indicate possible operating systems installed at the information handling system 102.

Each of the configuration item fields 223-230 is associated with one of the configuration table fields 210-220. Thus, configuration item field 223 is associated with configuration table field 210, while configuration item field 226 is associated with configuration table field 214. The configuration item fields 223-230 each store information indicating a particular entry in the configuration table identified by the associated configuration table field. Thus, the configuration item field 223 stores the information labeled CI1, which indicates a particular entry in the table T1. Accordingly, the configuration item fields 223-230 identify the configuration changes for the information handling system 102. For example, if configuration field 223 indicates a particular network card, this indicates that the network card was installed at the information handling system 102 since the last update to the CMDB 130.

The version information 232 indicates a version of the CMDB 130 associated with the configuration tags 222. Thus, the CMDB 130 can include different configuration database versions. Each of these versions can include different configuration tables. The version information 232 identifies which version at the CMDB 130 should be used to interpret the configuration tags 222.

The checksum information 234 indicates a checksum value for the configuration tags 222. This checksum value can be used by the technical support system 134 to ensure that the configuration tags 222 provide valid configuration information. This ensures that the configuration changes represented by the configuration tags 222 are appropriately communicated to the technical support system 134. Typically, the more checksum bits, the less likely that a false configuration tag would be accepted. In addition, false configuration tags can also be detected from erroneous table values detailed below.

As illustrated, the configuration tags 222 are encoded by the configuration analysis tool 120 to the information string 240. In a particular embodiment, the encoding compares current and previous config items for updates since the last synch with CMDB. Changed tables are put in priority order. A table's new values can be their actual table value (including numbers, strings, or enumeration), use a table-specific map of encodings for common long-values, or a compression of uncommon long-values which may need continued to another config tag. Further, in an embodiment each table has an implied mapping for the range of its values or a specific mapping for the new value, thus avoiding the space needed for the full range.

In the illustrated embodiment, the information string is a 16 character alphanumeric string that can be quickly and accurately provided by a user to the technical support center 106. Thus, the information string 240 allows a user to provide configuration update information in a simple and accurate manner, improving the interaction between the user and the technical support center 106, and allowing technical issues to be resolved more quickly and more accurately.

It will be appreciated that although the configuration information is illustrated in FIG. 2 as being recorded in tables, other formats that map to a table are possible, such as storing the configuration information in sets of XML name-value pairs.

Figure 3:
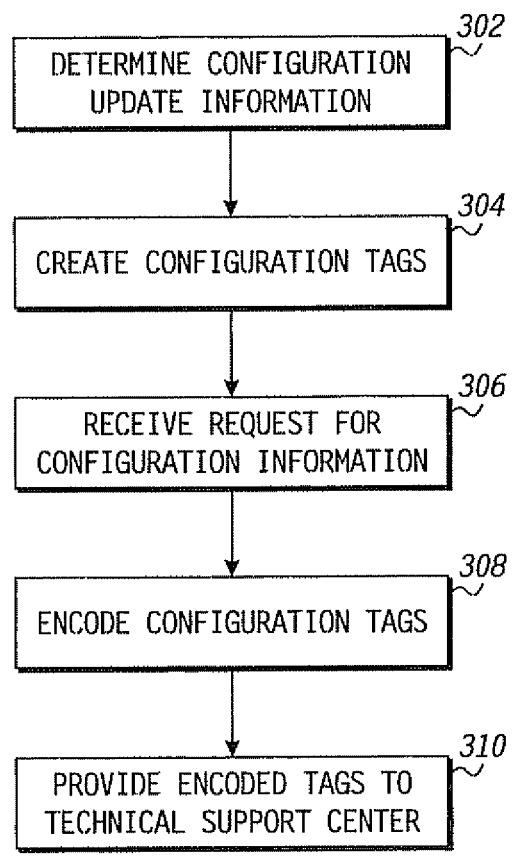
FIG. 3 is a flow diagram of a particular embodiment of a method of determining configuration information.

Referring to FIG. 3, a flow diagram of a method for providing configuration update information is illustrated. At block 302, a configuration analysis tool determines configuration update information for an information handling system. The configuration update information can include information identifying changes to what hardware or software, or both, are installed at the information handling system. At block 304, the configuration analysis tool creates and stores configuration tags based on the configuration update information. The configuration tags identify a subset of configuration information at a CMDB. The subset indicates the updates at the information handling system.

At block 306, a request is received to provide the configuration update information. For example, a user can invoke the configuration analysis tool or other software tool to provide the information. Alternatively, a technical support center can automatically request the configuration update information remotely via a network connection. At block 308, in response to the request, the configuration tags are encoded. In a particular embodiment, the configuration tags are encoded to provide an alphanumeric string that can be displayed for a user. At block 310 the encoded tags are provided to a technical support center for decoding. By providing the configuration update information via the encoded configuration tags, the configuration update information can be provided quickly and accurately.

Figure 4:
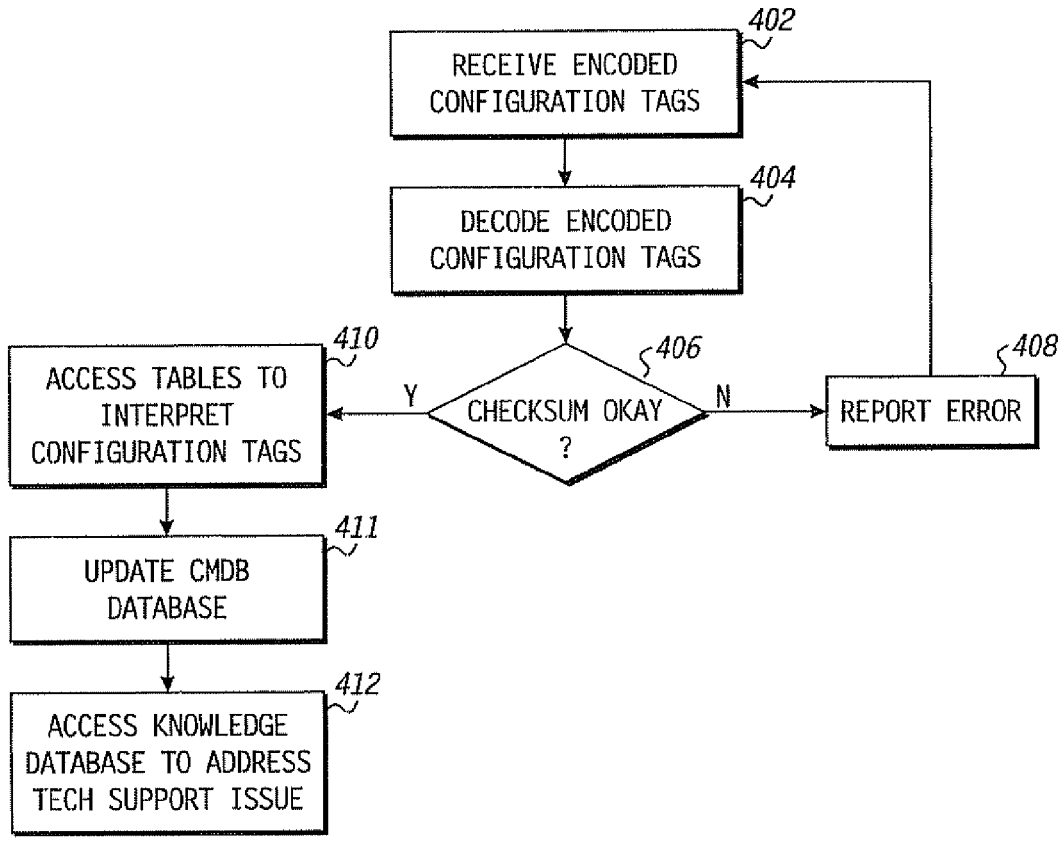
FIG. 4 is a flow diagram of a particular embodiment of a method of receiving configuration information.

Referring to FIG. 4, a flow diagram of a particular embodiment of a method of receiving configuration information is illustrated. At block 402, encoded configuration tags are received at a technical support system. The encoded configuration tags represent configuration update information for an information handling system. In a particular embodiment, the encoded configuration tags represent a subset of information at a CMDB for the information handling system.

At block 404 the encoded configuration tags are decoded to produce decoded configuration tags. At block 406, the technical support system determines whether checksum information in the decoded configuration tags indicates that accurate configuration update information has been received. If not, the method moves to block 408 and the technical support system reports an error so that a support technician can take appropriate action. For example, the support technician can confirm that the encoded configuration tags were appropriately entered, can request that the encoded configuration tags be retransmitted, and the like.

Returning to block 406, if it is determined, based on the checksum information, that accurate configuration information has been received, the method flow moves to block 410 and the technical support system accesses a set of tables to interpret the decoded configuration tags. These tables can be stored at a centralized CMDB, at the technical support system, and the like. At block 411, the interpreted configuration tags are used to update the CMDB to develop accurate and up-to-date configuration information for the information handling system. The method flow moves to block 412 and the technical support system uses the configuration information to access a knowledge database and address technical support issues.

Figure 5:
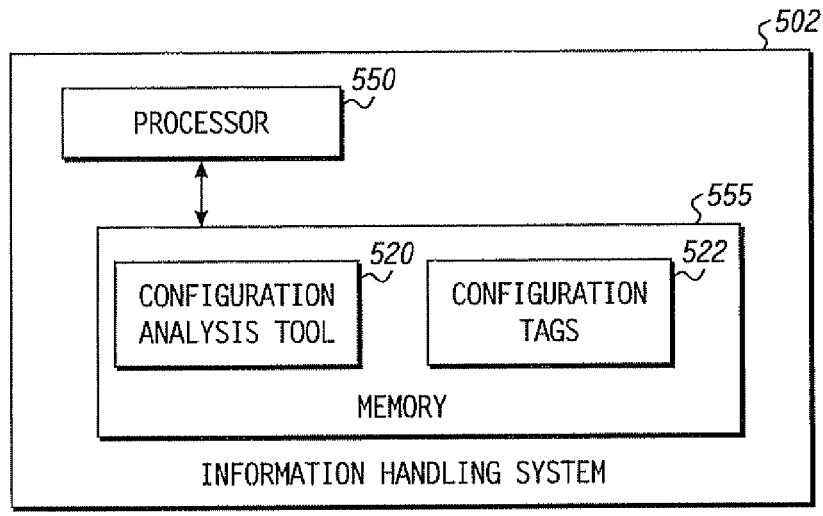
FIG. 5 is a block diagram of a particular embodiment of an information handling device.

Referring to FIG. 5, a block diagram of a particular embodiment of an information handling system 502, corresponding to the information handling system 102 of FIG. 2, is illustrated. The information handling system 502 includes a processor 550 and a memory 555. The processor 550 can be a microprocessor, microcontroller, application specific integrated circuit (ASIC) and the like. The memory 555 is a computer readable medium that can be volatile memory, such a random access memory (RAM), or non-volatile memory, such as a hard disk, flash memory, read only memory, and the like.

The memory 555 is accessible by the processor 550, and stores a configuration analysis tool 520 and configuration tags 522. The configuration analysis tool 520 includes instructions to manipulate the processor 550 to perform various functions, including instructions to create and encode the configuration tags 522. Further, the configuration analysis tool 520 can include instructions to manipulate the processor 550 to perform any of the methods disclosed herein.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
receiving, at a technical support center, first configuration information representative of a configuration of a personal computer at a first time, the configuration comprising at least one of hardware attributes, software attributes, or firmware attributes of the personal computer, and wherein the first configuration information is determined by, and stored at, the personal computer;
storing the configuration information at a configuration management database (CMDB) accessible to the technical support center;
receiving, at the technical support center, encoded information representative of a change in configuration of the personal computer relative to the configuration of the personal computer at the first time, the encoded information determined by the personal computer and representing a subset of configuration information categories for the personal computer stored at the CMDB, the encoded information comprising an alphanumeric string to simplify communication of the change in configuration to an operator at the technical support center by a user of the personal computer via a configuration update device, the communication including at least one of verbal recitation or keyboard-enabled transmission of the alphanumeric string;
decoding the encoded information at the technical support center to produce decoded information, the decoding initiated by the operator; and
determining, at the technical support center, a change to the configuration of the personal computer relative to the configuration at the first time based on the decoded information and based on the first configuration information.

2. The method of claim 1, wherein the decoded information indicates a first set of tables, and wherein the first set of tables identifies a subset of tables for the configuration information stored at the CMDB.

3. The method of claim 2, wherein the decoded information further indicates a first set of configuration values, each configuration value in the first set of configuration values is associated with a corresponding table in the first set of tables.

4. The method of claim 3 wherein determining changes to the configuration comprises:
determining a first table in the first set of tables is associated with a first configuration item; and
determining the configuration of the first configuration item based upon the configuration value associated with the first table.

5. The method of claim 4, wherein the first configuration item represents a version of software or data installed at the personal computer.

6. The method of claim 4, wherein the first configuration item represents hardware or firmware installed at the personal computer.

7. The method of claim 2, wherein the decoded information indicates the first set of tables in a priority order, the priority order based upon a predicted likelihood of a fault at the personal computer, the prediction based on the first set of tables and information stored at the CMDB prior to receiving the encoded information.

8. The method of claim 1, wherein the CMDB is one of a plurality of CMDBs, and wherein the CMDB is updated automatically based on the decoded information.

9. The method of claim 1, further comprising verifying the decoded information based on a checksum value of the decoded information.

10. The method of claim 1, wherein the encoded information is received via a device selected from the group consisting of: a computer chat program, an interactive voice response system, a hand-held computer device, and a web page.

11. The method of claim 10, further comprising updating the CMDB based on the decoded information.

12. A method comprising:
determining, at a personal computer, a first configuration of the personal computer at a first time, the first configuration comprising at least one of hardware attributes, software attributes, or firmware attributes of the personal computer;
providing configuration information representative of the first configuration of the personal computer to a technical support center, the technical support center operable to store the configuration information at a configuration management database (CMDB);
determining, at the personal computer, a second configuration of the personal computer at a second time, the second time after the first time;
determining, at the personal computer, a difference between the first configuration and the second configuration;
determining, at the personal computer, an encoded representation of the difference comprising an alphanumeric string to simplify communication of the difference to the technical support center; and
displaying the alphanumeric string at the personal computer to facilitate communication of the alphanumeric string, by a user of the personal computer, to an operator at the technical support center via a configuration update device, the communication including at least one of verbal recitation or keyboard-enabled transmission of the alphanumeric string.

13. The method of claim 12, further comprising:
storing, at the personal computer, second information identifying a second change in configuration of the personal computer, the second information representing a second subset of configuration information for the personal computer stored at the CMDB; and
wherein encoding the first information to produce encoded configuration information comprises encoding the first information and the second information to produce the encoded configuration information.

14. The method of claim 13, wherein the encoded configuration information is a compressed representation of the first information and the second information.

15. A non-transitory computer storage medium embodying a computer program, the computer program comprising instructions to manipulate a processor, the instructions comprising: instructions to store first information at a personal computer, the first information identifying a first change in configuration of the personal computer, the first change in configuration relative to a configuration represented by information previously provided to a configuration management database (CMDB), the CMDB located at a technical support center, the first information representing a first subset of configuration information categories for the personal computer stored at the CMDB, the first change in configuration comprising the addition or removal of a hardware device, firmware, or software from the personal computer; instructions to encode the first information to produce encoded configuration information comprising an alphanumeric string representative of the first information; and instructions to display the alphanumeric string at the personal computer to facilitate communication of the alphanumeric string by a user of the personal computer to an operator at the technical support center, the communication including verbal recitation of the alphanumeric string.

16. The non-transitory computer storage medium of claim 15, the instructions further comprising:
instructions to store, at the personal computer, second information identifying a second change in configuration of the personal computer, the second information representing a second subset of configuration information for the personal computer stored at the CMDB; and
wherein the instructions to encode the first information to produce encoded configuration information comprise instructions to encode the first information and the second information to produce the encoded configuration information.

17. The non-transitory computer storage medium of claim 15, wherein the first information indicates a first set of tables, and wherein the first set of tables identifies a subset of tables for the configuration information stored at the CMDB.

18. The non-transitory computer storage medium of claim 17, wherein the first information further indicates a first set of configuration values, each configuration value in the first set of configuration values is associated with a corresponding table in the first set of tables.

19. The non-transitory computer storage medium of claim 18, wherein the first information represents a version of software or data installed at the personal computer.

20. The non-transitory computer storage medium of claim 18, wherein the first information represents hardware or firmware installed at the personal computer.

* * * * *